(No Model.)

B. F. McCRAY.
SULKY PLOW.

No. 282,207. Patented July 31, 1883.

WITNESSES:
Chas. T. Howell
C. Sedgwick

INVENTOR:
B. F. McCray
BY Munn & Co.
ATTORNEYS.

United States Patent Office.

BENJAMIN F. McCRAY, OF HAMLIN, KANSAS, ASSIGNOR TO HIMSELF AND ALEXANDER NITSCHE, OF SAME PLACE.

SULKY-PLOW.

SPECIFICATION forming part of Letters Patent No. 282,207, dated July 31, 1883.

Application filed December 16, 1882. (No model.)

*To all whom it may concern:*

Be it known that I, BENJAMIN F. McCRAY, of Hamlin, in the county of Brown and State of Kansas, have invented a new and Improved Sulky-Plow, of which the following is a full, clear, and exact description.

The object of the invention is to provide more efficient means than are now known for controlling a sulky-plow.

Reference is to be had to the accompanying drawings, forming part of this specification, in which similar letters of reference indicate corresponding parts in both the figures.

Figure 1:
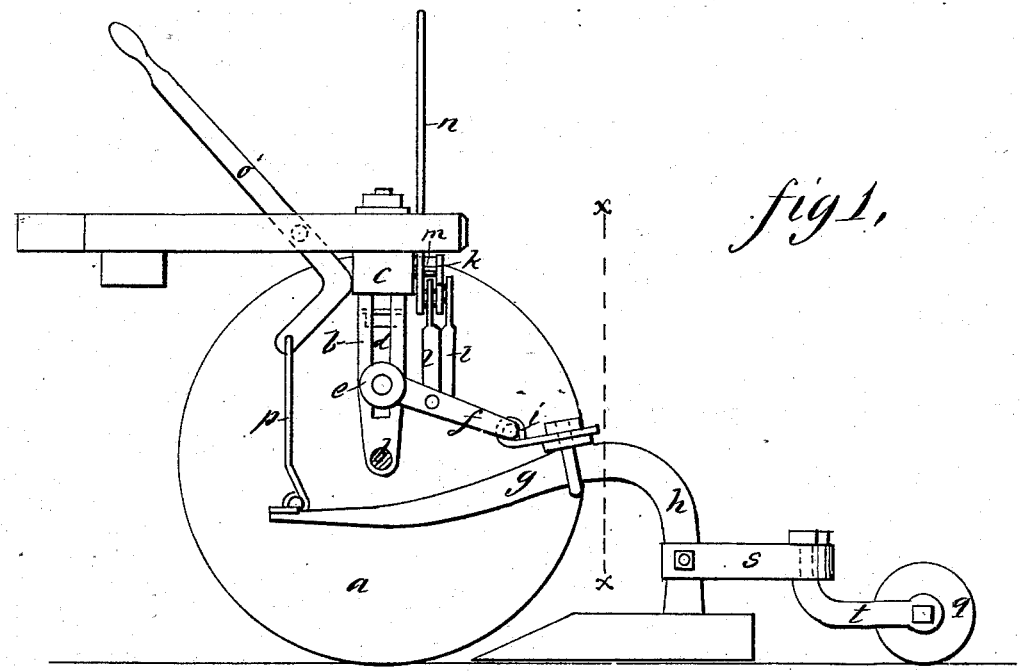
Figure 2:
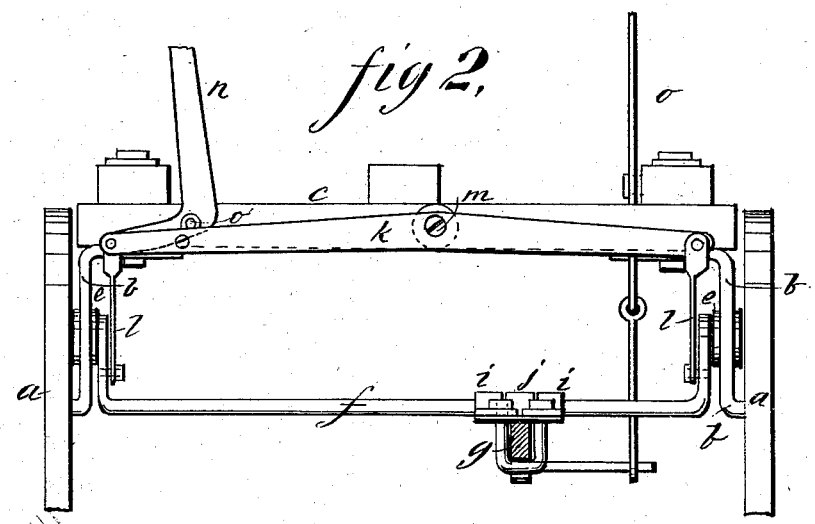

Figure 1 is a side elevation of my improved sulky-plow with one of the wheels removed, and Fig. 2 is a transverse section on the line $x x$ of Fig. 1.

The wheels $a$ are mounted on vertically-cranked axles $b$, on which the beam $c$ is mounted about even with the top of the wheels, said axles being slotted on the vertical parts at $d$ to receive the boxes $e$, in which the ends of the rearwardly-cranked bar $f$ are journaled, so that said bar may be shifted up and down in said axles $b$. The plow-beam $g$ is connected to this cranked bar $f$ a little in advance of the standard $h$ by a clip, $i$, that is capable of turning on said bar, but is prevented from sliding by a collar, $j$, keyed fast to the bar or fixed with a set-screw. The bar or bail $f$ is connected at the ends to the ends of a lever, $k$, respectively, by rods $l$, said lever $k$ being pivoted at its middle, or thereabout, to beam $c$ by a pivot, $m$, and at one end there is an elbow-lever, $n$, connected to it and fixed on a pivot, $o'$, so as to be worked by the attendant to tilt the rod $f$ by shifting one end up and the other down to "cant" the plow to right or left as may be required by the nature of the ground, as when it slopes to right or left. The front end of the plow-beam is connected to an elbow-lever, $o$, by a rod, $p$, to be raised or lowered for letting the plow down into the ground or raising it up to be carried above the ground, as desired; and a caster-wheel, $q$, is attached to the stock $h$ by bracket $s$ and standard $t$, to run in the furrow behind the plow to gage the depth of the furrow. In practice the standard will be adjustable vertically in the bracket $s$ by washers and other means to enable it to be used for varying the depth of the furrow.

It will be seen that the contrivance is such that the plow will not be affected materially by the running of the wheels $a$ over uneven ground because the bar $f$, by which the draft is applied to the plow, will shift in the slots $d$ of the axles $b$ as the wheels rise and fall.

By the application of the power to the plow-beam from the bar $f$ near to the plow-standard, together with the gage-wheel $q$, the plow will be carried wholly, or nearly so, by the wheels, thus preventing most of the friction on the bottom of the furrow common to most plows.

Having thus fully described my invention, I claim as new and desire to secure by Letters Patent—

The combination of levers $n$ and $k$ with the cranked bar $f$, having the plow attached to it, and said bar $f$ being mounted in the vertically-slotted cranked axles $b$, substantially as described.

BENJAMIN F. McCRAY.

Witnesses:
HENRY J. WELTMER,
ALEX NITSCHE.